United States Patent [19]

Eckardt et al.

[11] Patent Number: 4,573,835

[45] Date of Patent: Mar. 4, 1986

[54] MACHINE FOR BORING A PLATE WORKPIECE

[73] Inventors: Rudolf Eckardt, Wesel; Horst Frielingsdorf, Remscheid, both of Fed. Rep. of Germany

[75] Assignee: Flachglass Aktiengesellschaft, Gelsenkirchen, Fed. Rep. of Germany

[21] Appl. No.: 300,968

[22] Filed: Sep. 10, 1981

[30] Foreign Application Priority Data

Sep. 11, 1980 [DE] Fed. Rep. of Germany ....... 3034107

[51] Int. Cl.$^4$ .............................................. B23B 47/00
[52] U.S. Cl. ......................................... 408/37; 408/51; 408/53; 51/80 R; 51/111 R
[58] Field of Search ............... 408/37, 39, 41, 51, 408/53; 51/80 R, 111 R

[56] References Cited

U.S. PATENT DOCUMENTS

| 1,951,093 | 3/1934 | Johnston | 408/41 |
| 3,015,832 | 1/1962 | Zagar | 408/43 |
| 3,121,769 | 2/1964 | Horn | 408/53 |
| 3,192,801 | 7/1965 | Gingras | 408/9 |
| 3,568,367 | 3/1971 | Myers | 408/37 |
| 3,813,820 | 6/1974 | Highberg et al. | 408/37 |
| 3,976,386 | 8/1976 | Marantette et al. | 408/43 |

FOREIGN PATENT DOCUMENTS 559046  9/1932  Fed. Rep. of Germany.

Primary Examiner—Gil Weidenfeld
Assistant Examiner—Daniel W. Howell
Attorney, Agent, or Firm—Karl F. Ross; Herbert Dubno

[57] ABSTRACT

A machine for boring a hole in a plate workpiece comprises a support, a lower clamp arm carried on this support and having an upper clamp surface adapted to support the workpiece, an upper clamp arm carried on the support and having a vertically displaceable lower clamp surface adapted to press the workpiece down against the upper clamp surface, a lower drill arm pivotal about a horizontal axis on the support and having an outer end provided with an upwardly directed boring tool, and an upper drill arm pivotal about a horizontal axis on the support and having an outer end provided with a downwardly directed boring tool. Respective motors in the support for the machine pivot the arms and rotate the tools.

4 Claims, 2 Drawing Figures

MACHINE FOR BORING A PLATE WORKPIECE

FIELD OF THE INVENTION

The present invention relates to a drilling mcahine. More particularly this invention concerns a machine for boring a hole in a plate workpiece, such as a sheet of glass.

BACKGROUND OF THE INVENTION

A heavy-duty industrial-grade machine for boring a large plate workpiece, such as a sheet of glass, normally has upper and lower clamp elements one of which, normally the upper one, is vertically displaceable toward and away from the other, and upper and lower drill heads both vertically displaceable toward and away from each other. The workpiece is gripped between the clamp elements, and then the drill heads are moved toward each other to bore through the workpiece coaxially from opposite sides. Normally each such drill head has a spindle having at its business end a chuck holding an appropriate drilling tool, in the case of glass a diamond-grit hole saw.

These drill heads are normally mounted, in standard machine-tool fashion, on slides carried in T-slots of the frame or support of the boring machine. Although it is known, as for example from German Pat. No. 559,046, to mount half of the slide on a pivotal arm, nonetheless the vertical displacement of the tools into engagement with the workpiece is effected with a sliding action of the tool head on the end of the pivotal arm.

The problem with such a system is that the support structure for the tools is quite bulky. This bulkiness precludes ganging the machines for simultaneously performing a plurality of closely spaced bores in a workpiece. In addition when the machine is used with a glass workpiece the slide, which is relatively close to the working area, becomes fouled with glass dust and wears at a great rate.

The clamp elements are similarly slidable. Hence they normally have the same disadvantages.

OBJECTS OF THE INVENTION

It is therefore an object of the present invention to provide an improved machine for boring a plate workpiece.

Another object is the provision of such a machine for boring a plate workpiece which overcomes the above-given disadvantages.

Yet another object is to provide a boring machine which is relatively compact, so that several such machines can be mounted closely next to one another on the same base.

SUMMARY OF THE INVENTION

These objects are attained according to the instant invention in a machine of the above-described general type which comprises a support, a lower clamp arm carried on this support and having an upper clamp surface adapted to support the workpiece, an upper clamp arm carried on the support and having a vertically displaceable lower clamp surface adapted to press the workpiece down against the upper clamp surface, a lower drill arm pivotal about a horizontal axis on the support and having an outer end provided with an upwardly directed boring tool, and an upper drill arm pivotal about a horizontal axis on the support and having an outer end provided with a downwardly directed boring tool.

Thus the machine according to the instant invention can be axially relatively short, so that several such machines can be mounted together in close juxtaposition, even on the same base, for simultaneous drilling of a plurality of closely juxtaposed holes. In addition the moving parts, that is the pivot joint, can be relatively far from the boring location, so that this part will be exposed to minimum airborne grit and will, therefore, have a relatively long service life.

According to another feature of this invention, motor means is provided for pivoting said drill arms about the axes into engagement with a workpiece clamped between the clamp arms. Similarly other motor means displaces the upper clamp arm into engagement with the workpiece. These motor means are mounted in the support of the system according to this invention.

Although a vacuum-type clamp may be employed, normally according to the present invention the upper clamp arm is pivotal about a horizontal axis also. Thus a pincer-type clamp is used which has the advantage of limited size and simplicity, while also having its joint far from the working area.

In accordance with another feature of the invention, the axes of the drill arms are coaxial. In fact the upper clamp arm according to this invention is pivotal about the axis of the drill arms, so that all of the movable parts are pivotal about a common axis on the support.

The invention is based on the realization that perfect coaxial movement of the two drilling tools is not absolutely essential. Thus the motion of these tools along large-diameter arcs has been found to produce results well within the normal range of tolerances of slide-type machines. Even with a thick—greater than 20 mm—workpiece, the machine according to this invention has been found to operate precisely enough for virtually any use. Since such a machine must normally have as deep a throat as possible, the radius of the arc along which the drilling tools move is so large compared to the workpiece thickness that the hole drilled will be indistinguishable from one drilled by a slide-type machine. What is more, the pivot joint is spaced relatively far from the working location, so that it is less likely to be fouled by the dust and chips produced by the drilling operation.

DESCRIPTION OF THE DRAWING

The above and other features and advantages will become more readily apparent from the following, reference being made to the accompanying drawing in which.

SPECIFIC DESCRIPTION

Figure 1:
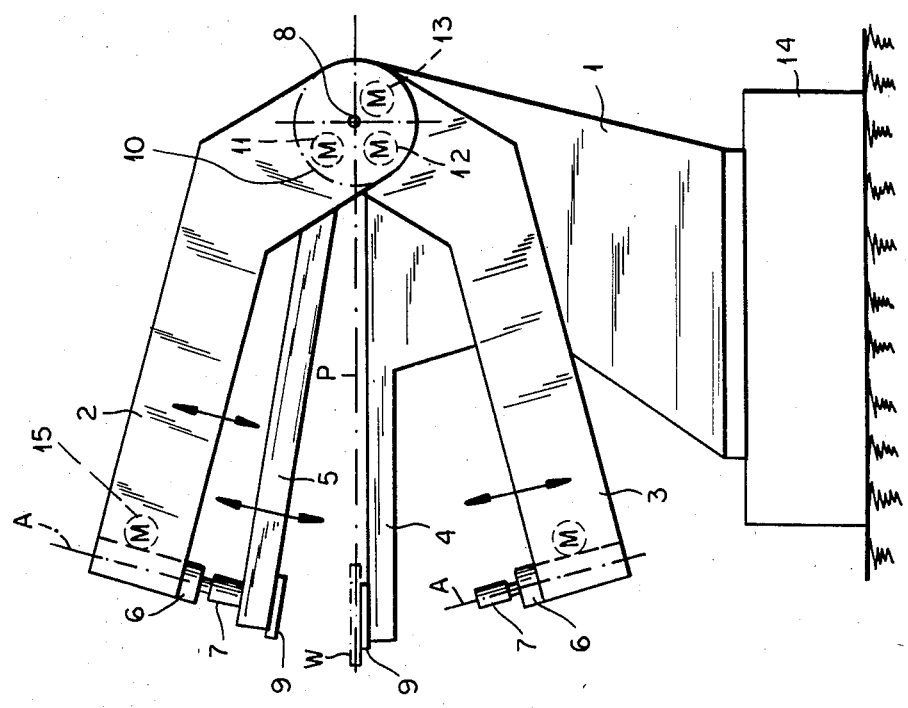
FIG. 1 is a partly schematic side view of the machine according to the instant invention in the open position.

As seen in FIG. 1 a machine for boring a hole in a workpiece W has a support 1 mounted on a base 14 that can carry a plurality of such machines. The machine basically comprises an upper drill arm 2, a lower drill arm 3, a lower clamp arm 4, and an upper clamp arm 5.

The two drill arms 2 and 3 are pivotal about a common horizontal axis 8, as is the upper clamp 5. Respective motors shown schematically at 11, 12, and 13 and received in the hub 10 at the axis 8 serve to pivot these arms 2, 3, and 5 about the axis 8. The lower clamp arm 4 is fixed.

The two drill arms 2 and 3 carry drill heads 6 each having a rotary drilling tool 7 formed by a standard diamond-grit hole saw rotatable about an axis A. Motors shown also schematically at 15 in the arms 2 and 3 rotate the respective heads 6 and their tools 7 about the axes A. The clamp arms 4 and 5 carry on their outer ends pads 9 that prevent marring of the workpiece W.

Figure 2:
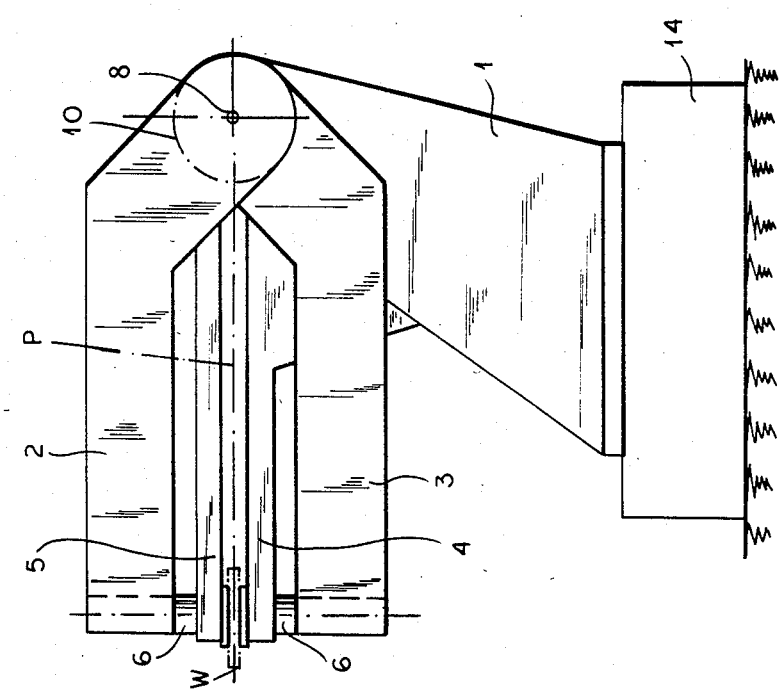
FIG. 2 is a view like FIG. 1 but showing the machine in the closed position.

In use the workpiece W is set on the pad 9 of the lower clamp arm 4 with the machine in the open position illustrated in FIG. 1. Then the motor 13 is operated to pivot the upper arm 5 down into the closed position of FIG. 2 to clamp the workpiece W tightly in place on the plane P which includes the axis 8. The two motors 11 and 12 are the actuated simultaneously with the two motors 15 to bring the arms 2 and 3 together, so that the tools 7 bore holes through the workpiece W from its opposite faces. Once the two tools 7 meet at the center, the two tool axes A are coaxial and a substantially perfect hole has been formed in the workpiece W.

The machine according to the instant invention is therefore relatively simple. No complex slide mount for the tools is used, thereby greatly decreasing the likelihood of breakdown. Since the pivot axis 8 is relatively far from the tools 7, the grit and dust generated by the boring operation will not be likely to enter into the accurately machined parts at this location.

We claim:

1. A machine for boring a hole in a glass plate, said machine comprising:
   a support;
   a lower clamp arm carried on said support and having an upper clamp surface adapted to support the glass plate;
   an upper clamp arm carried on said support and having a vertically displaceable lower clamp surface adapted to press the glass plate down against said upper clamp surface;
   a lower drill arm pivotal about a horizontal axis on said support and having an outer end provided with an upwardly directed boring tool centered on a tool axis;
   an upper drill arm pivotal about said horizontal axis on said support and having an outer end provided with a downwardly directed boring tool centered on a tool axis, the tool axes lying in a common vertical plane generally perpendicular to the horizontal axis;
   drive means for rotating the tools about the respective tool axes; and
   motor means for moving at least one of said clamp arms toward the other clamp arm to secure the glass plate between the clamp surfaces and for pivoting both of said drill arms similarly toward each other about the horizontal axis from a position with the tool axes crossing each other toward a position with the tool axes coaxial and the tools in vertical engagement through the glass plate held by the clamp arms, whereby such movement of said tool arms bores a hole vertically through the glass plate.

2. The machine defined in claim 1 wherein said upper clamp arm is pivotal about a horizontal axis.

3. The machine defined in claim 1 wherein said upper clamp arm is pivotal about said axis of said drill means.

4. The machine defined in claim 1 wherein said motor means are carried in said support.

* * * * *